Figure 1:
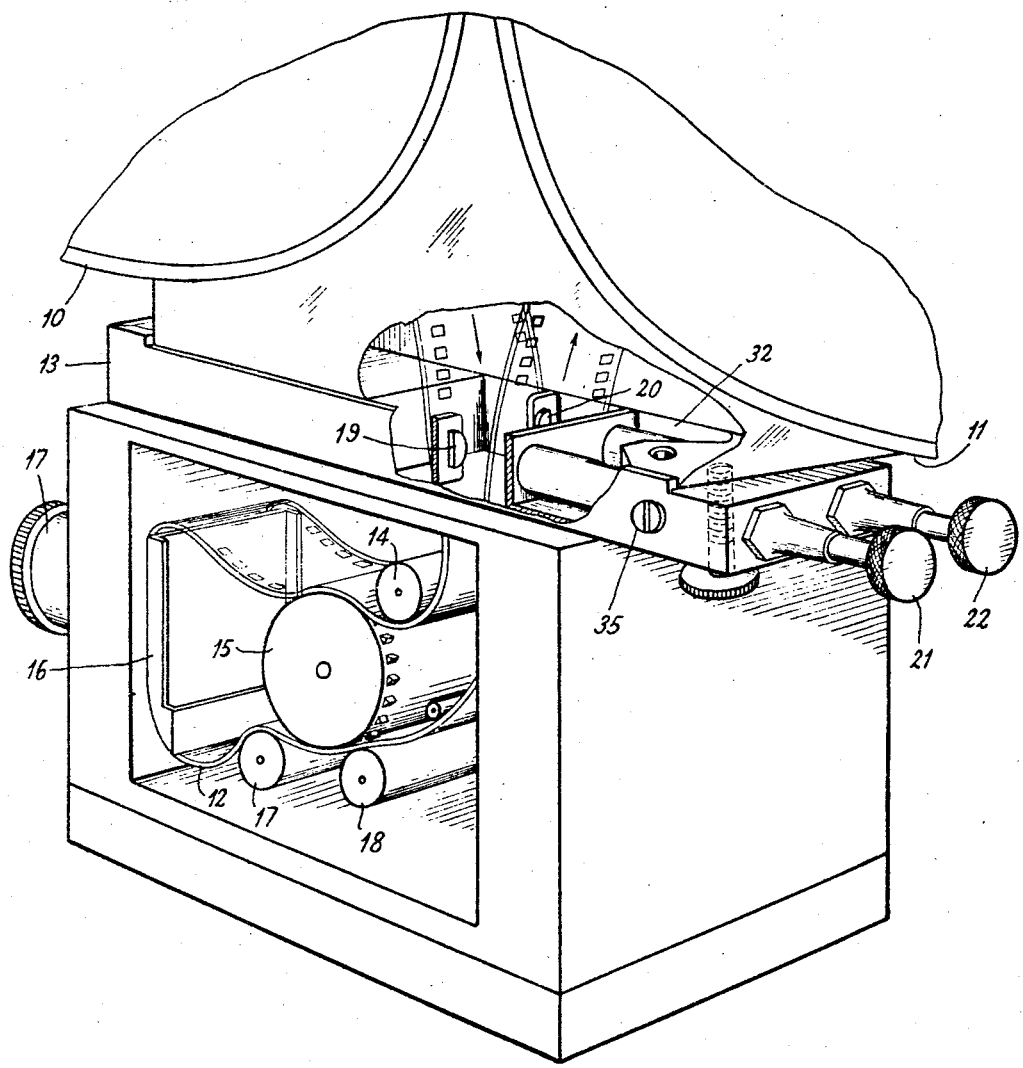

March 28, 1939. A. C. WINCHESTER 2,151,822
FILM MARKING DEVICE
Filed Oct. 16, 1935 2 Sheets-Sheet 1

INVENTOR
A. C. WINCHESTER
BY
ATTORNEY

March 28, 1939. A. C. WINCHESTER 2,151,822
FILM MARKING DEVICE
Filed Oct. 16, 1935 2 Sheets-Sheet 2

INVENTOR
A. C. WINCHESTER
BY
ATTORNEY

Patented Mar. 28, 1939

2,151,822

UNITED STATES PATENT OFFICE 2,151,822

FILM MARKING DEVICE

Armstead C. Winchester, Hollywood, Calif., assignor to RKO Studios, Inc., a corporation of Delaware Application October 16, 1935, Serial No. 45,220

6 Claims. (Cl. 164—87)

This invention relates to the production of motion pictures, and has for its principal object the provision of an improved film marking apparatus and method of operation which (1) makes it possible to select from a film roll only such takes or scenes as it is desired to develop, (2) is readily applicable to or removable from standard types of motion picture camera without marring the appearance of such cameras, and (3) automatically removes the film punchings in a manner to prevent them from scratching the film negative.

In the production of motion pictures, it is desirable that some means be provided for designating on the negative film roll those takes or scenes which are considered most desirable. Such a pre-development breakdown of the negative picture film is advantageous in that about sixty percent of the usual development cost is saved. In accordance with this invention, such a selection or breakdown is achieved by means including a film marker which is readily interposed between the camera and film magazine, which is operated independently of the camera action and interferes in no way with the operation of the camera and which produces indentations adapted to catch the hand of an attendant who rewinds the film roll in a dark room thus enabling him to select readily the takes to be developed and to separate them from the undesired takes which are stored for possible future use.

The invention will be better understood from the following description when considered in connection with the accompanying drawings, and its scope will be pointed out in the appended claims.

Figure 2:
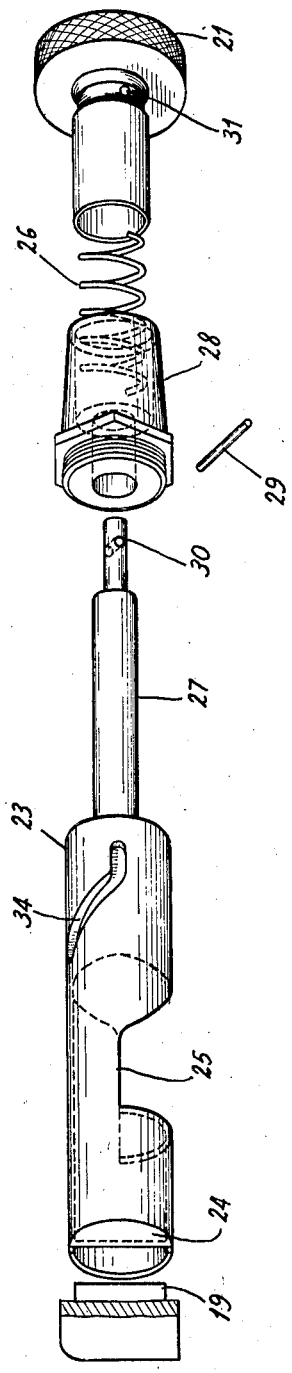

Referring to the drawings,

Fig. 1 is a perspective view of a motion picture camera to which the invention has been applied, and Fig. 2 illustrates certain details of the film marking device.

The motion picture camera illustrated by Fig. 1 includes a film feed reel magazine 10 and a film take-up reel magazine 11. From the film feed magazine 10 film 12 passes through an opening in a film marking device 13, under a roller 14, over a sprocket 15 to the usual picture gate 16 where it is exposed to the scene through a lens system 17. From the picture gate 16 the film passes over rollers 17 and 18 and under the sprocket 15 back through the opening in the film marking device 13 to the take-up reel magazine 11.

It will be observed that the dies 19 and 20 of the film marker 13 are interposed between the sections of film entering and leaving the motion picture camera. These dies cooperate with cutters which are moved against the film by means of knobs 21 and 22 to cut semi-circularly shaped punches from the edge of the film.

As shown more clearly in Fig. 2, the film punching mechanism includes a cylindrical member or a hollow punch 23 which is provided at its end with a cutter 24 adapted to cooperate with the die 19, is hollow at its cutting end and cut away at 25 to permit disposal of the film punchings. It is constrained to move spirally when it is pressed toward the die 19 by means of the knob 21 and is returned to its non-cutting position by means of a spring 26 and a shaft 27 operatively coupled to this spring and the associated member 28 by means of a pin 29 which passes through an opening 30 in the reduced end of the shaft 27 and an opening 31 at the rear of the control knob 21. Spiral movement of the member 23 is produced by means of a groove 34 which cooperates with the end of a screw 35 (Fig. 1) in the side of the marking device.

The fact that the marking device is interposed between the motion picture camera and the film magazine makes it possible to notch the film as desired without regard to the action of the motion picture camera and the spiral movement of the cutter, from its engagement with the die, functions to carry the film punching into a compartment 32 and to thus ensure that the film punchings do not drop into the motion picture camera and interfere with its operation. It will be observed that the film marking device 13 is readily interposed between the motion picture camera and the film magazines 10 and 11 and does not in any way disfigure the apparatus.

I claim:

1. The combination of a film magazine, a motion picture camera, and a film marker provided with cooperative marking members interposed between said magazine and camera and with means operable to move one of said members through a spiral path relatively to the other of said members for removing film punchings from the film path.

2. A film marking device including a die member, a film cutting member, and means operable to move said cutting member spirally into engagement with said die member.

3. A film marking device including a die member, a film cutting member, means operable to move said cutting member spirally into engagement with said die member, and resilient means tending to separate said members.

4. A film marking device including a die member disposed at one side of a film path, a film cutter including a hollow punch provided with a lateral opening at a point intermediate its ends, and means for imparting to said punch a combined linear and rotational motion whereby film punchings are removed from said path through said opening.

5. A film marking device including a die member disposed at one side of a film path, a film cutter including a hollow punch provided with a lateral opening at a point intermediate its ends, and means including a spiral spring for imparting to said punch a combined linear and rotational movement whereby film punchings are removed from said path through said opening.

6. The combination of a film magazine, a motion picture camera and a film marking device including a die member, a hollow punch provided with a lateral opening at a point intermediate its ends, and means for imparting to said punch a combined linear and rotational motion whereby film punchings are removed from the film path.

ARMSTEAD C. WINCHESTER.